United States Patent
Gustman et al.

(10) Patent No.: US 12,067,657 B2
(45) Date of Patent: Aug. 20, 2024

(54) DIGITAL IMAGE ANNOTATION AND RETRIEVAL SYSTEMS AND METHODS

(71) Applicant: StoryFile, Inc., Los Angeles, CA (US)

(72) Inventors: Samuel Michael Gustman, Los Angeles, CA (US); Andrew Victor Jones, Los Angeles, CA (US); Michael Glenn Harless, Los Angeles, CA (US); Stephen David Smith, Los Angeles, CA (US); Heather Lynn Smith, Los Angeles, CA (US)

(73) Assignee: Story File, Inc., Los Angeles, CA (US)

( * ) Notice: Subject to any disclaimer, the term of this patent is extended or adjusted under 35 U.S.C. 154(b) by 0 days.

(21) Appl. No.: 18/175,945

(22) Filed: Feb. 28, 2023

(65) Prior Publication Data

US 2023/0274481 A1   Aug. 31, 2023

Related U.S. Application Data

(60) Provisional application No. 63/314,977, filed on Feb. 28, 2022.

(51) Int. Cl.
| | | |
|---|---|---|
| G06F 3/048 | (2013.01) | |
| G06F 16/632 | (2019.01) | |
| G06T 11/60 | (2006.01) | |
| G06T 13/00 | (2011.01) | |
| G06V 10/77 | (2022.01) | |
| G06V 10/86 | (2022.01) | |
| G06V 10/94 | (2022.01) | |
| G06V 20/70 | (2022.01) | |

(52) U.S. Cl.
CPC ............ *G06T 11/60* (2013.01); *G06F 16/632* (2019.01); *G06T 13/00* (2013.01); *G06V 10/77* (2022.01); *G06V 10/86* (2022.01); *G06V 10/945* (2022.01); *G06V 20/70* (2022.01); *G06T 2200/24* (2013.01); *G06V 2201/10* (2022.01)

(58) Field of Classification Search
CPC ....... G06T 11/60; G06F 16/632; G06V 10/86; G06V 10/945
See application file for complete search history.

(56) References Cited

U.S. PATENT DOCUMENTS

| | | | |
|---|---|---|---|
| 10,303,756 B2* | 5/2019 | Noshadi | G06V 40/161 |
| 10,650,188 B2* | 5/2020 | Kasina | G06N 3/045 |
| 11,055,346 B2* | 7/2021 | Modi | G06F 16/686 |

(Continued)

OTHER PUBLICATIONS

Jomhari et al., Narrative in Text, Photo, and Video in Social Space, 2010; IEEE, 6 Pages.*

(Continued)

*Primary Examiner* — Linh K Pham
(74) *Attorney, Agent, or Firm* — Ahmann Kloke LLP

(57) ABSTRACT

In a digital image annotation and retrieval system, a machine learning model identifies an image feature in an image and generates a plurality of question prompts for the feature. For a particular feature, a feature annotation is generated, which can include capturing a narrative, determining a plurality of narrative units, and mapping a particular narrative unit to the identified image feature. An enriched image is generated using the generated feature annotation. The enriched image includes searchable metadata comprising the feature annotation and the plurality of question prompts.

16 Claims, 14 Drawing Sheets

(56) References Cited

U.S. PATENT DOCUMENTS

| | | | |
|---|---|---|---|
| 11,106,863 B1* | 8/2021 | Voss | G06Q 10/10 |
| 11,200,650 B1* | 12/2021 | Ben Zadok | G06N 3/04 |
| 11,704,355 B2* | 7/2023 | Jin | G06F 16/4393 |
| | | | 382/218 |
| 2012/0016892 A1* | 1/2012 | Wang | G06F 16/5866 |
| | | | 707/752 |
| 2013/0336543 A1* | 12/2013 | Bennett | G06V 40/10 |
| | | | 382/100 |
| 2015/0104058 A1* | 4/2015 | Rodriguez | G06F 16/5866 |
| | | | 382/100 |
| 2015/0138385 A1* | 5/2015 | Kim | H04N 23/62 |
| | | | 348/211.99 |
| 2015/0143236 A1* | 5/2015 | Tena Rodriguez | G06F 40/106 |
| | | | 715/273 |
| 2015/0220784 A1* | 8/2015 | Gold | G06V 20/10 |
| | | | 382/153 |
| 2016/0253833 A1* | 9/2016 | Lew | H04N 1/00196 |
| | | | 715/202 |
| 2017/0064363 A1* | 3/2017 | Wexler | H04L 67/306 |
| 2017/0308516 A1* | 10/2017 | Steplyk | H04L 51/08 |
| 2018/0357211 A1* | 12/2018 | Kasina | G06F 40/169 |
| 2018/0367729 A1* | 12/2018 | Parasnis | G06T 11/60 |
| 2019/0244257 A1* | 8/2019 | Goldman | G06Q 30/0276 |
| 2021/0133937 A1* | 5/2021 | Kathirvelu | G06T 5/92 |
| 2021/0404831 A1* | 12/2021 | Drummond | G01C 21/3614 |
| 2022/0392127 A1* | 12/2022 | Liu | G06T 7/0012 |

OTHER PUBLICATIONS

Bolanos et al., Toward Storytelling From Visual Lifelogging: An Overview, 2017, IEEE, 14 pages.*

"Amazon Mechanical Turk", URL: http://www.mturk.com; retrieved on Feb. 28, 2023.

"Talking Photo Album with Personalized Voice Recorded Messages", URL: https://www.amazon.com/Talking-Photo-Personalized-Recorded-Messages/dp/B00SLNUEYU; retrieved Feb. 28, 2023.

Doersch, Carl, et al., "What Makes Paris Look like Paris?", ACM Transactions on Graphics (SIGGRAPH 2012), Aug. 2012, vol. 31, No. 3.

Elson, David K., "Modeling Narrative Discourse", Ph.D. Thesis, Columbia University, New York City, 2012.

Gonzalez-Rico, Diana, et al., "Contextualize, Show and Tell: A Neural Visual Storyteller", Institute for Research in Applied Mathematics and Systems (IIMAS), Universidad Nacional Autonoma de Mexico (UNAM), Jun. 3, 2018.

Imran, Muhammad, "16 Image Annotation Tools to Get Your Labeling Project Started", URL: https://www.folio3.ai/blog/labelling-images-annotation-tool/; retrieved on Feb. 28, 2023.

Pratama, Andhika S., "5 Best Free Image Annotation Tools", URL: https://medium.com/data-folks-indonesia/5-best-free-image-annotation-tools-80919a4e49a8, Jan. 12, 2021.

Shivamgauruq, "Automated-hashtag-generation-using-Deep-Learning", URL: https://github.com/ShivamGaurUQ/Automated-hashtag-generation-using-Deep-Learning; retrieved on Feb. 28, 2023.

* cited by examiner

DIGITAL IMAGE ANNOTATION AND RETRIEVAL SYSTEMS AND METHODS

CROSS-REFERENCE TO RELATED APPLICATIONS

This application claims priority to U.S. Provisional Patent Application No. 63/314,977, filed Feb. 28, 2022, titled DIGITAL IMAGE ANNOTATION AND RETRIEVAL SYSTEMS AND METHODS, which is hereby incorporated by reference in its entirety.

BACKGROUND

There has been a trend for people to spend more of their time in the digital world, replacing real-world face-to-face and live telephone interaction with forms of digital interaction, such as texts, tweets, email, Facebook®, Instagram®, and the like. This trend, along with improvements in storage capacity and the processing power of personal devices, enables people to record and document their daily lives and to build up repositories of multimedia data files, such as text posts, photos, and videos. In another technological area, intelligent human-machine interactive systems, such as Alexa®, Siri®, Cortana® and the like have gained popularity. These systems, however, lack the ability to simulate a face-to-face, query-based conversation with another human being. Furthermore, customers cannot alter the metadata stored in these systems. Further still, these systems do not provide rich, user-generated metadata to be searched for highly specific, personalized content. For example, these systems do not allow searches for opinion, emotion, experience, activity, etc.

Many cameras, mobile devices and personal computers provide metadata associated to where and when the image was either originally taken—for example, if it was born digital or uploaded to the device if it was re-photographed or scanned. These items include timestamp metadata, and geo-location metadata. However, this means that a photograph taken in Marrakech, Morocco in 1984 using a traditional film camera could have time and geo-location metadata suggesting it was taken in Manhattan, New York, in 2022, if that was the place and time the image originally taken in Morocco was first digitized.

Social media systems allow users to share photo albums of events with friends and family and tag additional. However, while users can search posts for individual word, time, or person, these systems do not provide a conversational interface to tag and search the photo albums and the stories behind them.

Figure 1:
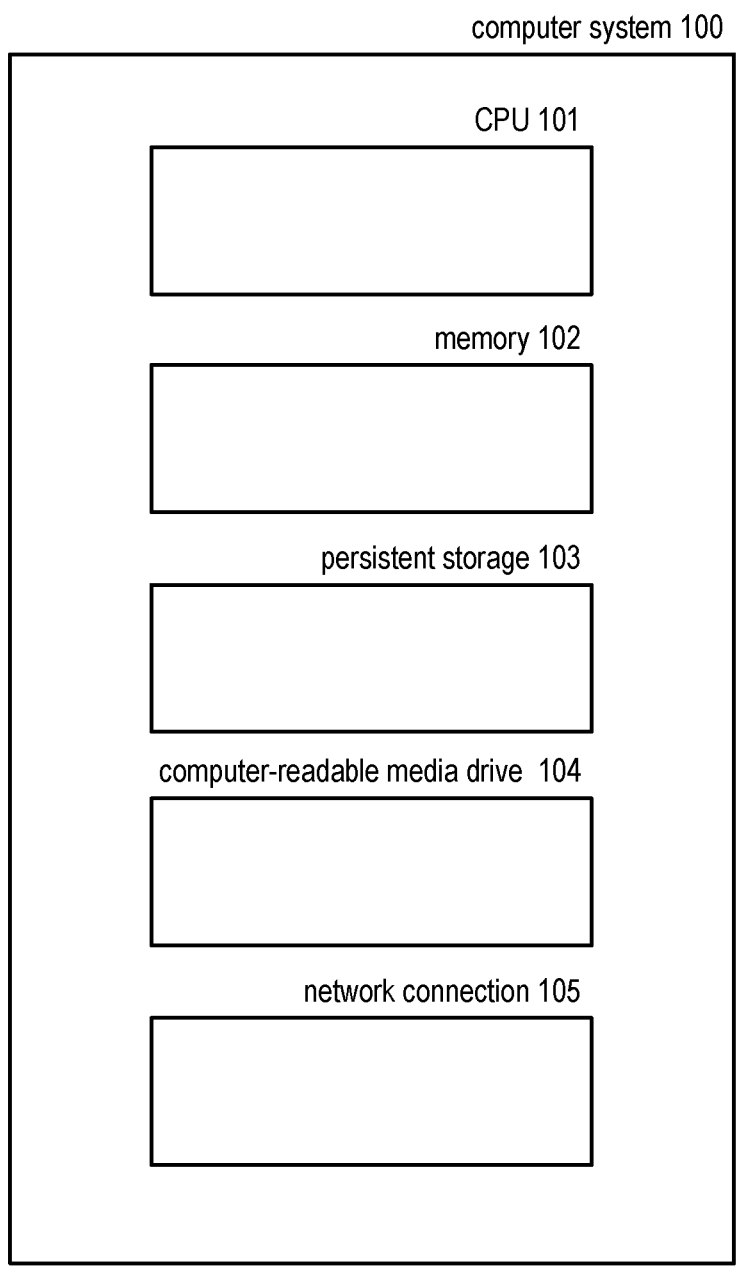
FIG. 1 is a block diagram showing some of the components typically incorporated in at least some of the computer systems and other devices on which the disclosed system operates in accordance with some implementations of the present technology.

The drawings have not necessarily been drawn to scale. For example, the relative sizes of signaling periods in the figures are not to scale, and the size of certain signaling or messaging periods may differ. Similarly, some components and/or operations may be separated into different blocks or combined into a single block for the purposes of discussion of some of the embodiments of the disclosed system. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents and alternatives falling within the scope of the technology as defined by the appended claims.

DETAILED DESCRIPTION

Disclosed herein are systems, methods, and computer-readable media for digital image annotation and retrieval. In some implementations, a machine learning identifies an image feature in an image and generates a plurality of question prompts for the feature. For a particular feature, a feature annotation is generated, which can include capturing a narrative, determining a set of narrative units, and mapping a particular narrative unit to the identified image feature. An enriched image is generated using the generated feature annotation. The enriched image includes searchable metadata comprising the feature annotation and the question prompts.

The systems and methods disclosed herein provide technical advantages over conventional systems. For example, some social networking platforms provide auto-generated video reels summarizing events based on photographic images. The reels conventionally use predefined templates to create montages of still images with musical accompaniment. Additional social comments may be included to help annotate the generated videos. However, the algorithms that generate the videos are not capable of knowing the underlying user story related to the image, which requires capture of the overall narrative. Instead, conventionally generated reels often include or juxtapose photographs or comments that do not create a coherent story or can create inappropriate assumptions about the relationship of ongoing relevance of an image to the individual viewing the reel. As another example, artificial intelligence (AI) algorithms can identify certain features within photographs. AI models are trained on manually labeled datasets, which can include end-users tagging faces on social media posts, or large labeled datasets based on publicly available images, such as images from Google®, Flickr®, YouTube®, and other sources. However, these techniques do not provide specific story-based information about an image category or other contextual information. For example, an algorithm may identify a 'cat', more specifically, a 'ginger cat', with even greater specificity, 'a ginger cat leaping', but an automatic image-based system cannot know, for example, that 'the ginger cat is uncle Harry's favorite pet Monty, who in 1992 was caught on film flying through the air to catch a sparrow in flight.' The systems, methods and computer-readable media disclosed herein solve these technical problems by generating rich, user-specific metadata that can be used to annotate certain portions of an image with contextual information.

Another technical problem in the field relates to the labeling of image data being time-consuming for an individual and/or resource-consuming if crowdsourced. Certain image annotation tools can facilitate labeling by enabling users to click on images to identify the locations of human pose/skeletons, object silhouettes, image regions and provide corresponding text descriptions and labels. However, these tools are focused on simple short annotations and do not identify a detailed narrative within one or across more than one image or set of images. Nor do these tools enable a user to conversationally query the database based on prior acquired knowledge such as: 'Show me a picture of Monty', or 'What was the story of the flying cat?' The systems, methods and computer-readable media disclosed herein solve this technical problem by providing conversational user interfaces to allow subscribers to customize parameters for generating the rich, user-specific metadata.

Once labeled training data is available, machine learning algorithms can be trained for recognize classes of objects and suggest captions for existing photographs. The algorithms are trained on datasets of photos that have manually labeled captions. These are correlated with visual image features. If an algorithm works correctly, then a picture of a seagull could be labeled as "A bird is sitting on a rock". While these algorithms provide image annotations, these are not personalized for the photographer or image subjects. The annotations do not connect to real-world identities, places, and events and are limited to what is shown directly in the image. Often the true story behind a photo includes what isn't shown, and what happened right before or after the photo was taken, such as "[t]he satisfied seagull that stole our picnic in Maine, 1986. Grandma was so upset she ran up and down the beach swotting seagulls yelling, We need Harry's flying cat!.' Check out the photo of Grandma on the beach." Existing semantic sentence encoders can merely quantify the similarity/difference between sentences for search and retrieval or to predict follow-up text, but do not produce cohesive narratives. Conventional video editing systems can add motion to photos (e.g., to bring motion to old family photos). However, such motion is generic and visual, and does not provide any story-based narrative to identify semantic meaning in sentences. The systems, methods and computer-readable media disclosed herein solve these technical problems by generating rich, user-specific metadata that can be used to annotate certain portions of an image with contextual information and, further, can link particular image features and/or associated rich metadata to other portions of the narrative not shown in a particular image.

Physical photo albums can include built-in audio recorders and speakers, but such entries are not designed for search and retrieval. The systems, methods and computer-readable media disclosed herein solve these technical problems by generating rich, user-specific metadata that is capable of being parsed, indexed, and/or searched and by providing user-interactive interfaces to accomplish the same.

Overview

For brevity, the terms "user" and "subscriber" are used interchangeably, although one of skill will appreciate that certain features of the disclosed systems and techniques can be accessible to individuals or entities that are not registered with service providers. The term "story" refers to a collection of enhanced (annotated, enriched) images. The term "narrative" refers to source data used to generate annotations. The term "annotation" refers to enriched unit of metadata and/or context information that is mapped to a particular image or item in an image. Annotations can include tags, labels, data items, generated question prompts, parsed question answers, and/or the like.

Digital Image Annotation System(s)

FIG. 1 is a block diagram showing some of the components typically incorporated in at least some of the computer systems and other devices on which the disclosed system operates. In various implementations, these computer systems and other devices 100 can include server computer systems, desktop computer systems, laptop computer systems, netbooks, mobile phones, personal digital assistants, televisions, cameras, automobile computers, electronic media players, etc. In various implementations, the computer systems and devices include zero or more of each of the following: a central processing unit (CPU) 101 for executing computer programs; a computer memory 102 for storing programs and data while they are being used, including the facility and associated data, an operating system including a kernel, and device drivers; a persistent storage device 103, such as a hard drive or flash drive for persistently storing programs and data; computer-readable media drives 104 that are tangible storage means that do not include a transitory, propagating signal, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of a facility, those skilled in the art will appreciate that the facility may be implemented using devices of various types and configurations, and having various components.

Figure 2A:
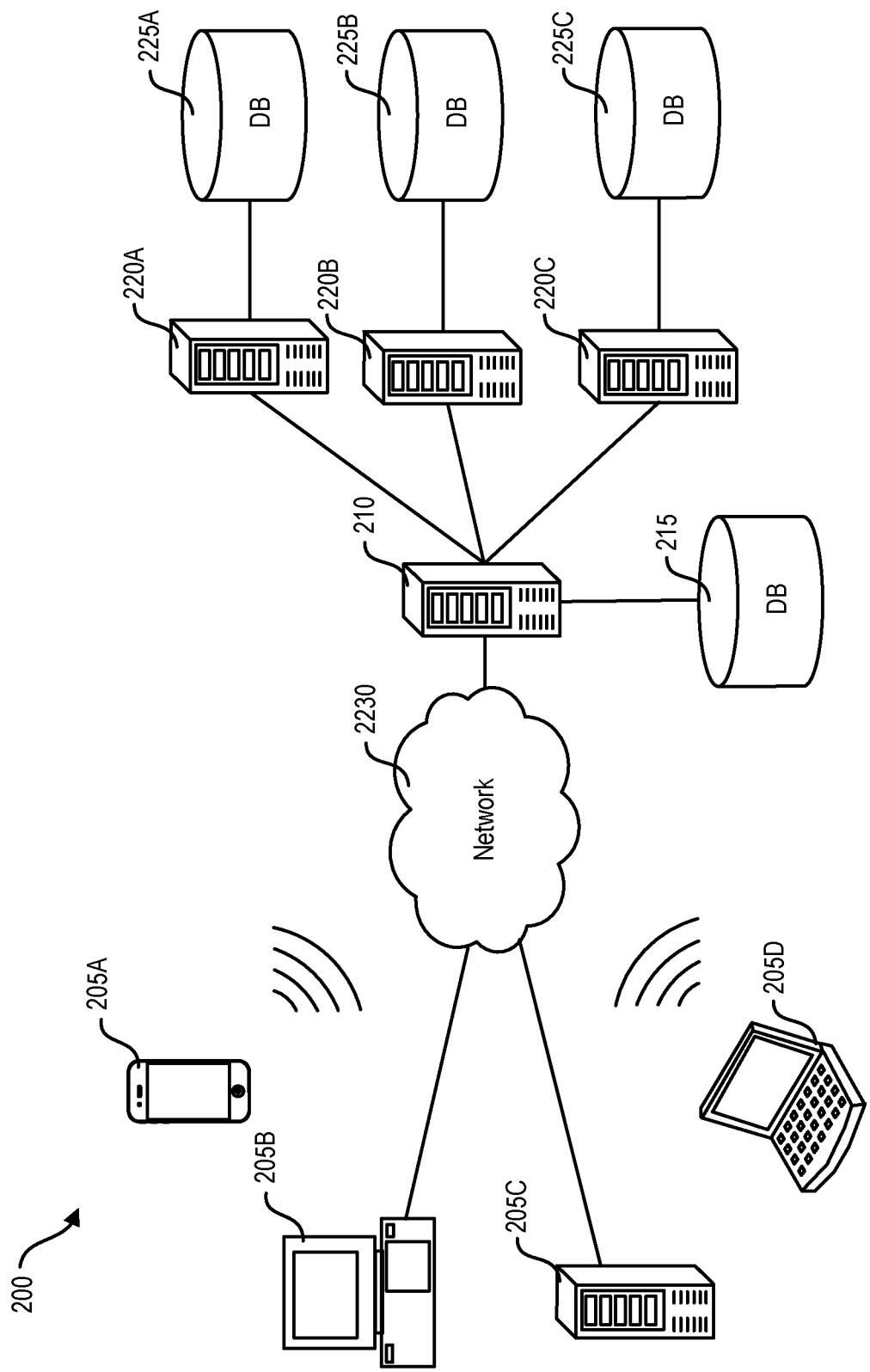
FIG. 2A is a system diagram illustrating an example of a computing environment in which the disclosed system operates in some implementations of the present technology.

FIG. 2A is a system diagram illustrating an example of a computing environment in which the disclosed system operates in some implementations. In some implementations, environment 200 includes one or more client computing devices 205A-D, examples of which can host the system 100. Client computing devices 205 operate in a networked environment using logical connections through network 2230 to one or more remote computers, such as a server computing device.

In some implementations, server 210 is an edge server which receives client requests and coordinates fulfillment of those requests through other servers, such as servers 220A-C. In some implementations, server computing devices 210 and 220 comprise computing systems, such as the system 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server or client devices. In some implementations, servers (210, 220A-C) connect to a corresponding database (215, 225A-C). As discussed above, each server 220 can correspond to a group of servers, and each of these servers can share a database or can have its own database. Databases 215 and 225 warehouse (e.g., store) information such image-related information, narrative-related information, tag-related information, mapping-related information, subscriber-related information, and so on. Though databases 215 and 225 are displayed logically as single units, databases 215 and 225 can each be a distributed computing environment encompassing multiple computing devices, can be located within their corresponding server, or can be located at the same or at geographically disparate physical locations.

Network 2230 can be a local area network (LAN) or a wide area network (WAN), but can also be other wired or wireless networks. In some implementations, network 2230 is the Internet or some other public or private network. Client computing devices 205 are connected to network 2230 through a network interface, such as by wired or wireless communication. While the connections between server 210 and servers 220 are shown as separate connections, these connections can be any kind of local, wide area, wired, or wireless network, including network 2230 or a separate public or private network.

Figure 2B:
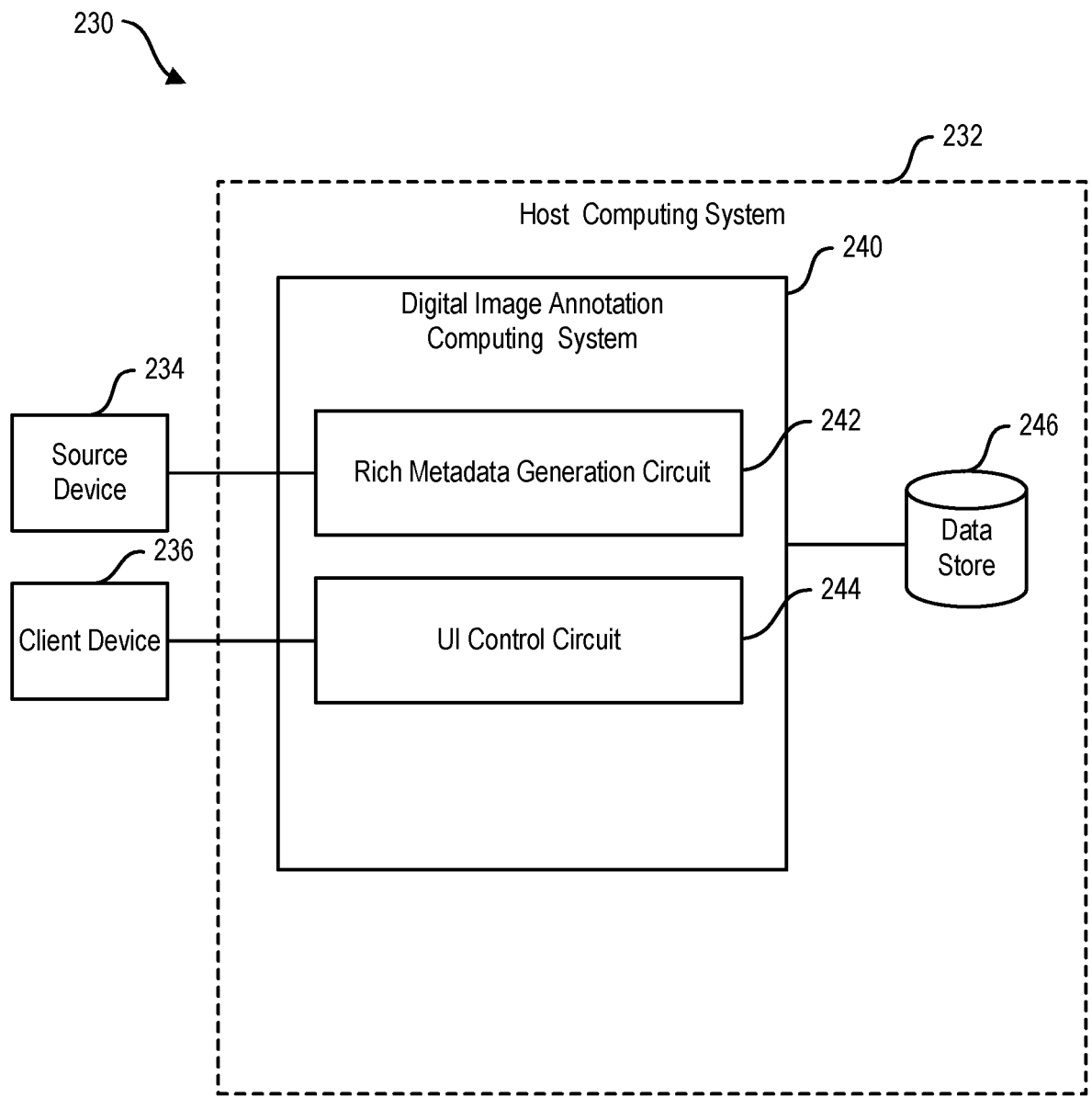
FIG. 2B is a system diagram illustrating example components associated with the disclosed system in some implementations of the present technology.

FIG. 2B is a system diagram illustrating example components associated with the disclosed system 230 in some implementations of the present technology. As a general overview, to overcome technical limitations of existing systems and techniques, the inventors have conceived and reduced to practice a story-tagging digital image annotation computing system. The system 230 is structured to perform digital image annotation and retrieval using audio and video speech-to-text and/or natural language processing for the capture, management, editing, search and retrieval of still and moving images. While the discussion herein pertains to natively digital and/or digitized source images, one of skill in the art will recognize that the systems and techniques disclosed herein can be used with other forms of digital content. Such other forms of digital content can include videos, avatars, virtual environment renderings, video/image streams, and/or other forms of multimedia. In operation, the system combines multimedia elements, such as images, with natural language annotations and features to form searchable inter-image and cross-image narratives. These elements enable guided search based on not only the image itself, but the story behind the image and multimedia. For example, a user-entered natural language search can be used to extract or otherwise determine a search term and use the search term to search inter-image and cross-image narratives, including image content, image metadata, and any custom questions and/or responses associated with the image.

As shown, the system 230 can include a host computing system 232, which includes at least in part a digital image annotation computing system 240. In some implementations, the host computing system 232 is a smartphone, tablet, laptop, server, or another computing device, and the digital image annotation computing system 240 includes computer-executable code executing on the host computing system 232. In some implementations, the host computing system 240 is a database management system, an image/multimedia archival system, and/or the like, and the digital image annotation computing system 240 includes computer-executable code executing on or provided to the host computing system 232. In some implementations, the computer-executable code of the host computing system 232 can include one or more circuits, controls, binaries, graphics and/or other components that comprise a user interface, such as a graphical user interface. In some implementations, the computer-executable code comprises an encoder tool, which may or may not be coupled to a graphical user interface. For example, an encoder tool for tagging images with rich metadata and can be implemented as a middleware layer in a computing system, as a business logic layer in a database management system or image retrieval system, and/or the like.

As shown, the digital image annotation computing system 240 is communicatively coupled, via a communications network, to a source device 234 and/or a client device 236. The source device 234 provides source images and/or other digital content to the digital image annotation computing system 240 and can be any of a user-operated computing device, a camera, a scanner, a smartphone, a virtual reality-enabled computing device, a wearable, a file server, or another suitable singular or distributed computing system or device. In some implementations, the source device 234 is a computing device or server associated with a content provider, such as a social network, content delivery network, digital archival service, storytelling media retrieval system, or another suitable entity. In some implementations, the source device 234 is operated by an entity that operates the digital image annotation computing system 240. In some implementations, the digital image annotation computing system 240 is operated by a different entity.

The client device 236 receives various outputs generated by the digital image annotation computing system 240. The outputs can include annotated digital files, enriched digital files comprising custom-generated metadata, groups of digital files linked via one or more common narratives, and so forth. The client device 236 can include or be included, at least in part, in the source device 234. For example, in some implementations, the client device 236 and the source device 234 are the same device or computing system used by a subscriber to provide source images and receive, display and/or store the transformed, enriched digital files. For example, in some implementations, the client device 236 and the source device 234 can be a social network that both provides the source images and receives and facilitates the posting of the transformed, enriched digital files. The client device 236 and/or the source device 234 can be included, at least in part, in the digital image annotation computing system 240 or can be separate from the digital image annotation computing system 240.

As shown, the digital image annotation computing system 240 can include a rich metadata generation circuit 242 and a user interface (UI) control circuit 244, which can be combined in whole or in part. These circuits can include objects, scripts, computer-executable code, computer hardware, computer software, and/or the like to facilitate the operations described herein. These circuits can include or be communicatively coupled to one or more data stores 246 structured to retrievably store intermediate (temporary) and/or final outputs of various computer-based operations. According to various implementations, a data store 246 can be or include one or more of a database management system, cache memory, file folder or directory, electronic file, key-value pair, and/or the like.

According to various implementations, the rich metadata generation circuit 242 and/or the UI control circuit 244 can include one or more machine learning models. The machine learning models can be structured to perform any suitable artificial intelligence-based operations to identify features within images, generate question prompts for subscribers, generate annotations, generate synthetic video and/or audio, map items in transcripts to identified features, generate motion in video from a particular mapping, generate enriched images, generate enriched narratives, generate conversational user interfaces, and/or the like. Machine learning models can include one or more convolutional neural networks (CNN), deep learning (DL) models, translational models, natural language processing (NLP) models, computer vision-based models, or any other suitable models for enabling the operations described herein.

In some implementations, the machine learning models can include one or more neural networks. As an example, neural networks may be based on a large collection of neural units (or artificial neurons). Neural networks may loosely mimic the manner in which a biological brain works (e.g., via large clusters of biological neurons connected by axons). Each neural unit of a neural network can be connected with many other neural units of the neural network. Such connections can be enforcing or inhibitory in their effect on the activation state of connected neural units. In some implementations, each individual neural unit may have a summation function which combines the values of all its inputs together. In some embodiments, each connection (or the neural unit itself) may have a threshold function such that the signal must surpass the threshold before it propagates to other neural units. These neural network systems can be self-learning and trained, rather than explicitly programmed, and can perform significantly better in certain areas of problem solving, as compared to traditional computer programs. In some implementations, neural networks can include multiple layers (e.g., where a signal path traverses from front layers to back layers). In some implementations, back propagation techniques may be utilized by the neural networks, where forward stimulation is used to reset weights on the "front" neural units. In some implementations, stimulation and inhibition for neural networks may be more free-flowing, with connections interacting in a more chaotic and complex fashion.

As an example, machine learning models can ingest inputs and provide outputs. In one use case, outputs can be fed back to a machine learning model as inputs to train machine learning model (e.g., alone or in conjunction with user indications of the accuracy of outputs, labels associated with the inputs, or with other reference feedback information). In another use case, a machine learning model can update its configurations (e.g., weights, biases, or other parameters) based on its assessment of its prediction (e.g., outputs) and reference feedback information (e.g., user indication of accuracy, reference labels, or other information). In another use case, where a machine learning model is a neural network, connection weights can be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this manner, for example, the machine learning model may be trained to generate better predictions.

As an example, where the prediction models include a neural network, the neural network can include one or more input layers, hidden layers, and output layers. The input and output layers can respectively include one or more nodes, and the hidden layers may each include a plurality of nodes. When an overall neural network includes multiple portions trained for different objectives, there may or may not be input layers or output layers between the different portions. The neural network can also include different input layers to receive various input data. Also, in differing examples, data can input to the input layer in various forms, and in various dimensional forms, input to respective nodes of the input layer of the neural network. In the neural network, nodes of layers other than the output layer are connected to nodes of a subsequent layer through links for transmitting output signals or information from the current layer to the subsequent layer, for example. The number of the links may correspond to the number of the nodes included in the subsequent layer. For example, in adjacent fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bi-directional structure, forward and backward connections may be provided. The links are also referred to as connections or connection weights, referring to the hardware implemented connections or the corresponding "connection weights" provided by those connections of the neural network. During training and implementation, such connections and connection weights may be selectively implemented, removed, and varied to generate or obtain a resultant neural network that is thereby trained and that may be correspondingly implemented for the trained objective, such as for any of the above example recognition objectives.

According to various implementations, machine learning models can be trained based on information stored in a local data store associated with the digital image annotation computing system 240 and/or a remote data store associated with the digital image annotation computing system 240 to generate predictions.

Referring again to various components of the digital image annotation computing system 240, the rich metadata generation circuit 242 and/or the UI control circuit 244 are particularly configured to perform various special-purpose operations, such as those described below.

In some implementations, the rich metadata generation circuit 242 and/or the UI control circuit 244 are structured to generate and/or retrieve annotations, which can be generally thought of as source elements for the generated linkable, context-specific units of rich or enriched metadata associated with digital items. In some implementations, annotations include environmental audio at time of capture, whereby a digital image can have an audio file recorded for a period of time via an automatic time lapse or a hold-to-record function. In some implementations, annotations can include pre-recorded audio serving as the annotation of the image or a new audio recording providing a description of the image and attached to the image after initial capture. In some implementations, annotations include previously recorded video, which provides a description or context for the image serving as an annotation attached to the image after initial digital capture or digitization and associated to the image through an embedded window or as an associated video file. In some implementations, annotations include newly recorded video which provides a description or context for the image serving as an annotation and is attached to the image after initial digital capture or digitization, and associated to the image through an embedded window or as an associated video file. In some implementations, annotations include speech-to-text items to create a dictated text-based story. In some implementations, annotations include speech-to-text transcription of the previously recorded or newly recorded audio and/or video describing the image to create a text based extended caption. In some implementations, annotations include recording of audio or text items during subsequent review of photo collection. In some implementations, annotations include emotional cues, such as indicators associated with emotions (e.g., crying, laughing, extended pauses, happy, sad, worried, excited, surprised, and so on) depicted in the image and/or emotions experienced by a viewer of the image, which can be automatically determined using machine learning and/or expressly specified by a user. In some implementations, annotations include labeled features within an image including people, animals, faces, objects, and/or places. These features can be manually labeled or automatically detected using image recognition or another suitable machine learning model. In some implementations, annotations include timestamps associated with image history. In some implementations, annotations include geospatial metadata associated with image history. In some implementations, annotations include machine-learning generated text queries associated with the image, along with people, places, and/or events depicted in the image.

Annotations can be associated with a single image or span multiple images. For example, a user can select a logical (connected) sequence of images as the audio annotation is recorded to make links between one image and the next. According to various implementations, the images need not be annotated at the same time or have a predetermined relationship, and searches for rich metadata can be performed across images. For example, if a user searches for 'the flying cat' within 'uncle Harry's image collection' using, for example, speech-to-text natural language processing, all images with Monty the flying cat can be presented, according to an implementation, where Monty was identified via audio, video, text caption, click-to-associate, tagging, or another method as 'flying cat'. This would include Monty the ginger cat in full flight, Grandma swotting seagulls at the beach and Monty heading to the chicken shed, as all three images are associated with the same cat. Furthermore, in some implementations, the labeled features in one image can be used to initialize feature labeling operations in subsequently acquired images and text.

In some implementations, the rich metadata generation circuit 242 and/or the UI control circuit 244 are structured to generate additional stories, annotations, and/or questions associated with the input media given a set of labeled text and image features. In some implementations, the system can include generative pretrained language models trained on large existing language corpus and refined to take text and image features as inputs. The model(s) can take as input an existing annotation from an image to generate longer annotations for the same photo and/or for subsequent images in a particular image sequence.

In some implementations, a user is presented with an option to accept or reject the generated annotation either partially or in its entirety. Furthermore, in some implementations, additional prompts can be generated. In response to the additional prompts, the user is enabled to record supplemental audio/video/text responses to associate with the image. Question prompts can also leverage geo-spatial and temporal metadata. As another example, given a photo of the Statue of Liberty, the system can suggest the question "When did you go to New York?" or, given a photo of a wedding, could suggest the prompt "Who got married?" or "What is your favorite wedding memory?" The generative network can also generate and present, via the user interface, answer options to each question based on the pretrained language probabilities. For example, given the prompt "Provide 3 reasons why the ginger cat bit Uncle Harry", the network can predict several candidate responses that the user can select from and inspire additional annotations.

After a text annotation has been generated, acquired via the user interface, and/or refined, the rich metadata generation circuit 242 and/or the UI control circuit 244 can use a generative AI model to generate a synthetic narration. For example, the circuit(s) can use text-to-speech synthesis to generate audio narration to accompany the original image. In some implementations, the circuit(s) can use video synthesis to generate an animated avatar or video to accompany the text and audio.

In some implementations, the rich metadata generation circuit 242 and/or the UI control circuit 244 are structured, given a combined annotated image and text, to generate additional visual and/or editing effects. For example, the system can provide multiple templates for presenting the information, such as voice-over narration, picture-in-picture, panning, and other visual emphasis effects, such as those shown in FIG. 4E and FIG. 8. The cuts and pans can draw focus towards the elements that were highlighted in the video, such as by visual emphasis (zooming in on a face in the image, or cutting to a relevant photo in the sequence, and so on).

In some implementations, the rich metadata generation circuit 242 and/or the UI control circuit 244 are structured to create a visual storyboard, whereby a series of images are laid into a visual sequence or path. The narrator can associate an audio and/or video description of the entire sequence, creating a single story from a set of related images.

Figure 8:
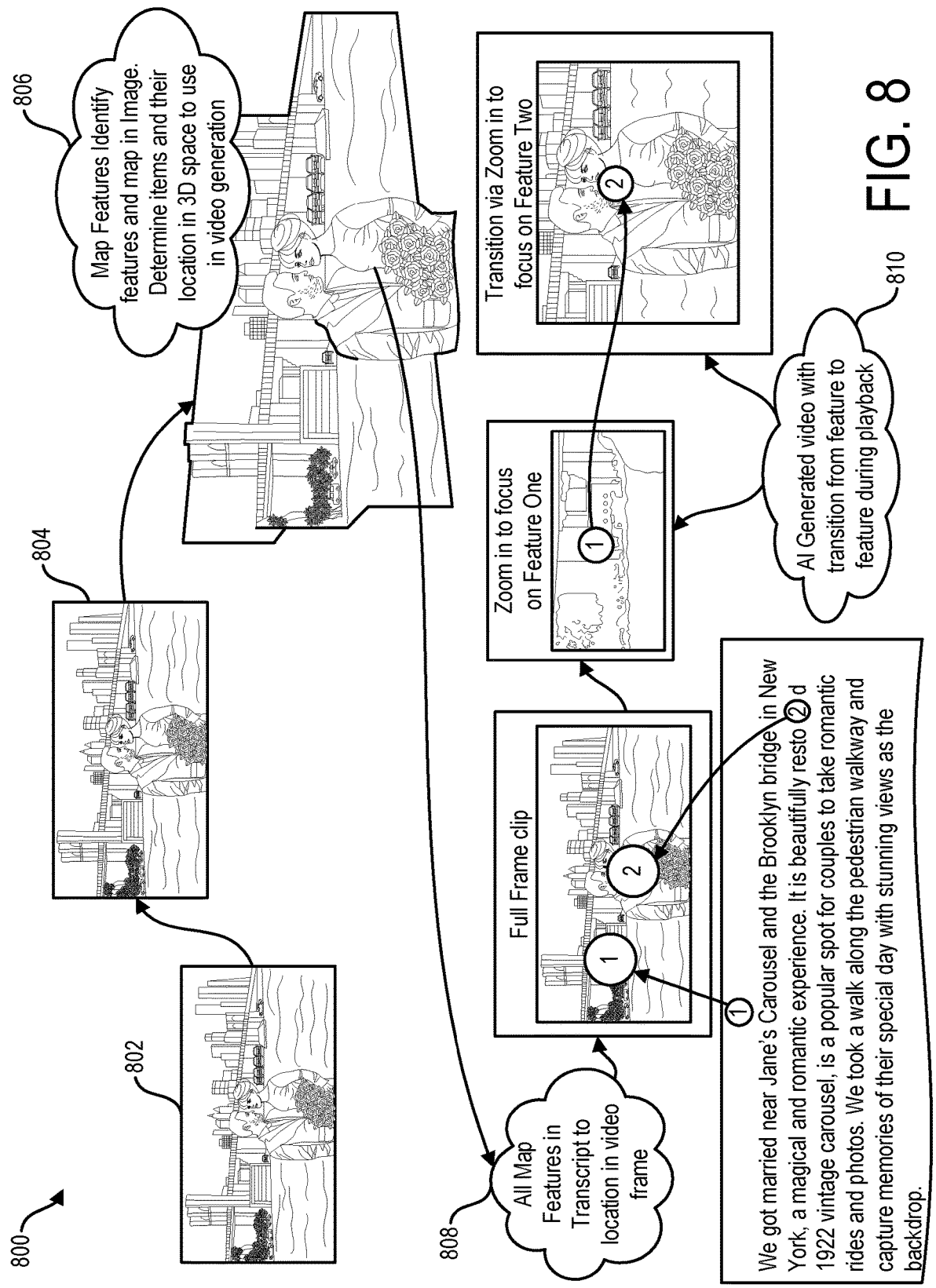
FIG. 8 illustrates an example process whereby annotated features can be used to generate animated paths between items in some implementations of the present technology.

The above example operations and digital tools enable analysis of the structure of the story, identifying the key people, places, events and/or actions in the image or sequence of images assembled and narrated, as described further in relation to FIG. 8.

In some implementations, output of the operations performed by the digital image annotation system 240, such as annotated photos, enriched images, and the like, can be fed into a storytelling multimedia retrieval system, such as a natural conversation storytelling system for conversation video disclosed in U.S. Pat. No. 11,107,465, incorporated herein by reference. The storytelling multimedia retrieval system can leverage both text and visual elements to connect photo stories with queries. A speech-to-text query could retrieve the sequence above using a command such as: 'Tell me about Monty the cat.' or Do you have photos of the flying cat?'. Alternatively a single image story could be retrieved by a query such as 'Can you tell me Grandma's seagull story?'.

In some implementations, the system provides a user interface to search the annotated images, retrieve them from the database, and play them back as individual images or as image folders, such as albums. In some implementations, the user can favorite and/or sub-organize the images to enable groups of connected images to be placed in relationship to one another. In some implementations, the system can further dynamically present multiple video components in real time in, for example, a browser environment.

In some implementations, the rich metadata generation circuit 242 and/or the UI control circuit 244 enable the generation of query response based on the generated metadata. In an example use case, the system can receive a natural language query and perform a sentence encoding of the question. Tokens parsed from the encoded sentences can be matched with one or more of an image embedding, text annotation embedding, or question encodings (user-defined or generated by a machine learning model). When generated by a machine learning model, the model can be trained to find related questions that have similar topics and meaning. Encoding algorithms used by the trained model can include the BERT variants, Universal Sentence Encoder, and/or encoders that match questions to answers, such as XLM-R and/or Universal Sentence Encoder Q&A. Encoding for text annotations and/or question prompts can be computed in real-time or precomputed and stored in a database or cached for faster data retrieval. As an additional technical advantage, the techniques described herein allow for search optimization using algorithms such as approximate nearest neighbor.

Accordingly, in some implementations, the rich metadata generation circuit 242 and/or the UI control circuit 244 enable conversational searches (e.g., natural-language searches). A conversational search can be limited to a given user's image collection or extended to other users' collections, such as a friend group, family tree, etc. A conversational search can be combined with data filters that restrict searched stories to a specific time range, geographic location, or that references to specific people or entities. For example, this would allow the user to only receive stories surrounding a wedding, or that feature the bride.

Digital Image Annotation Method(s) of Operation

Figure 3A:
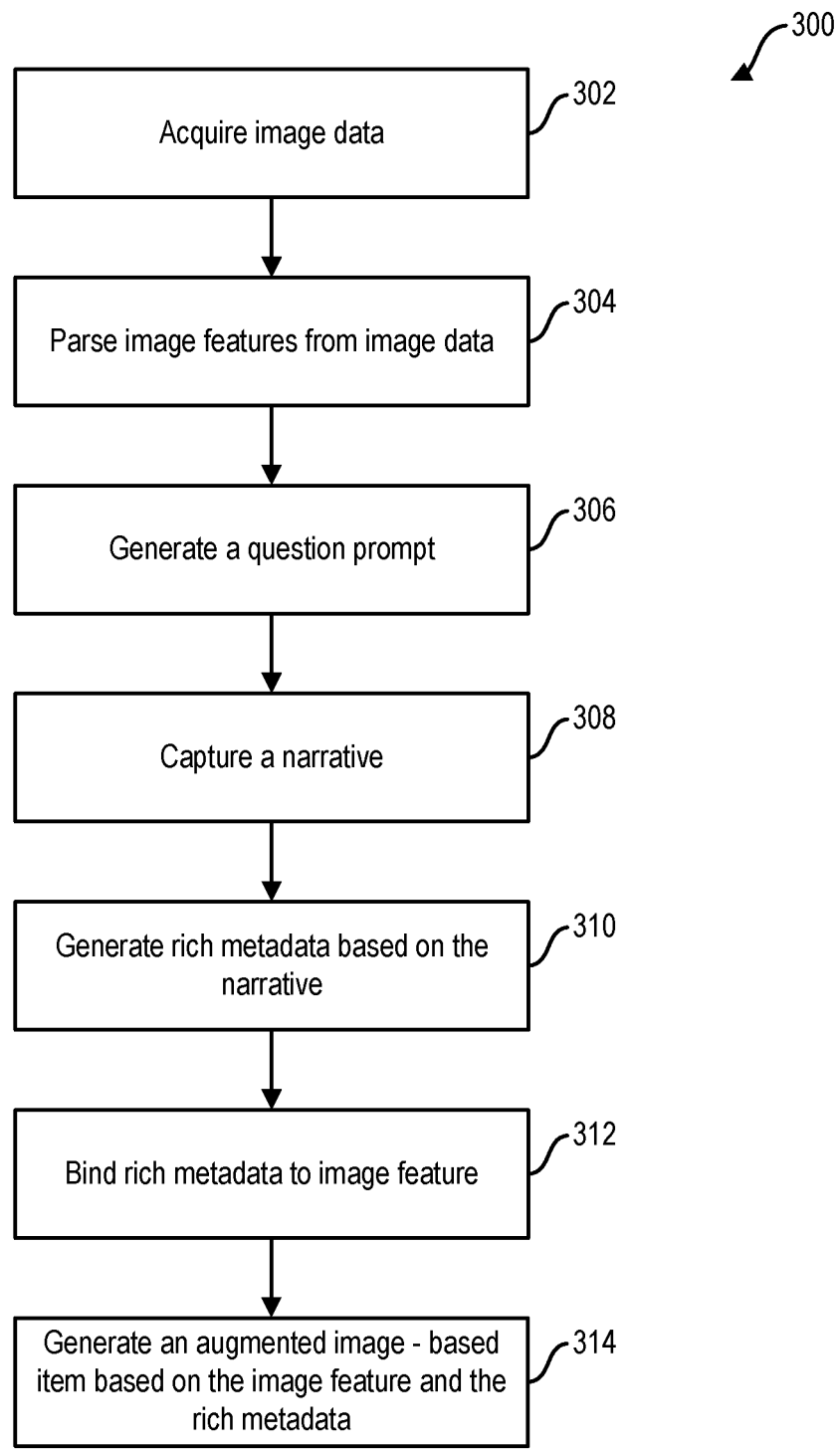
FIG. 3A is a flow diagram illustrating an example process that can be performed by the rich metadata generation circuit of the disclosed system in some implementations of the present technology.

FIG. 3A is a flow diagram illustrating an example process 300 that can be performed by the rich metadata generation circuit 242 or another circuit of the disclosed system in some implementations of the present technology. According to various implementations, operations 300 can be performed by or on the rich metadata generation circuit 242, UI control circuit 244, source device 234, client device 236 or another suitable computing system or device.

In operation, at 302, the rich metadata generation circuit 242 can acquire image data. According to various implementations, the image data can be acquired by enabling a user to upload an image, to capture the image in real-time (e.g., in a live feed or live capture mode), browse for an image, and so forth. In some implementations, the image is extracted, at 304, from a sequence or collection of images, such as a video. Operations 302-314 can be performed in any suitable order. For instance, conversational sessions can be initiated by a user searching for a particular image or feature or by the system by generating, at 306, one or more question prompts regarding the parsed image feature. As another example, a user narrative used to generate rich metadata, at 310, can be captured, at 308, before, during, or after acquiring image data. As yet another example, rich metadata can be generated, at 310, and bound to a particular image feature, at 312, before, during, or after generating an augmented (enriched) image at 314.

Example Client-Side Controls and User Interfaces

Figure 3B:
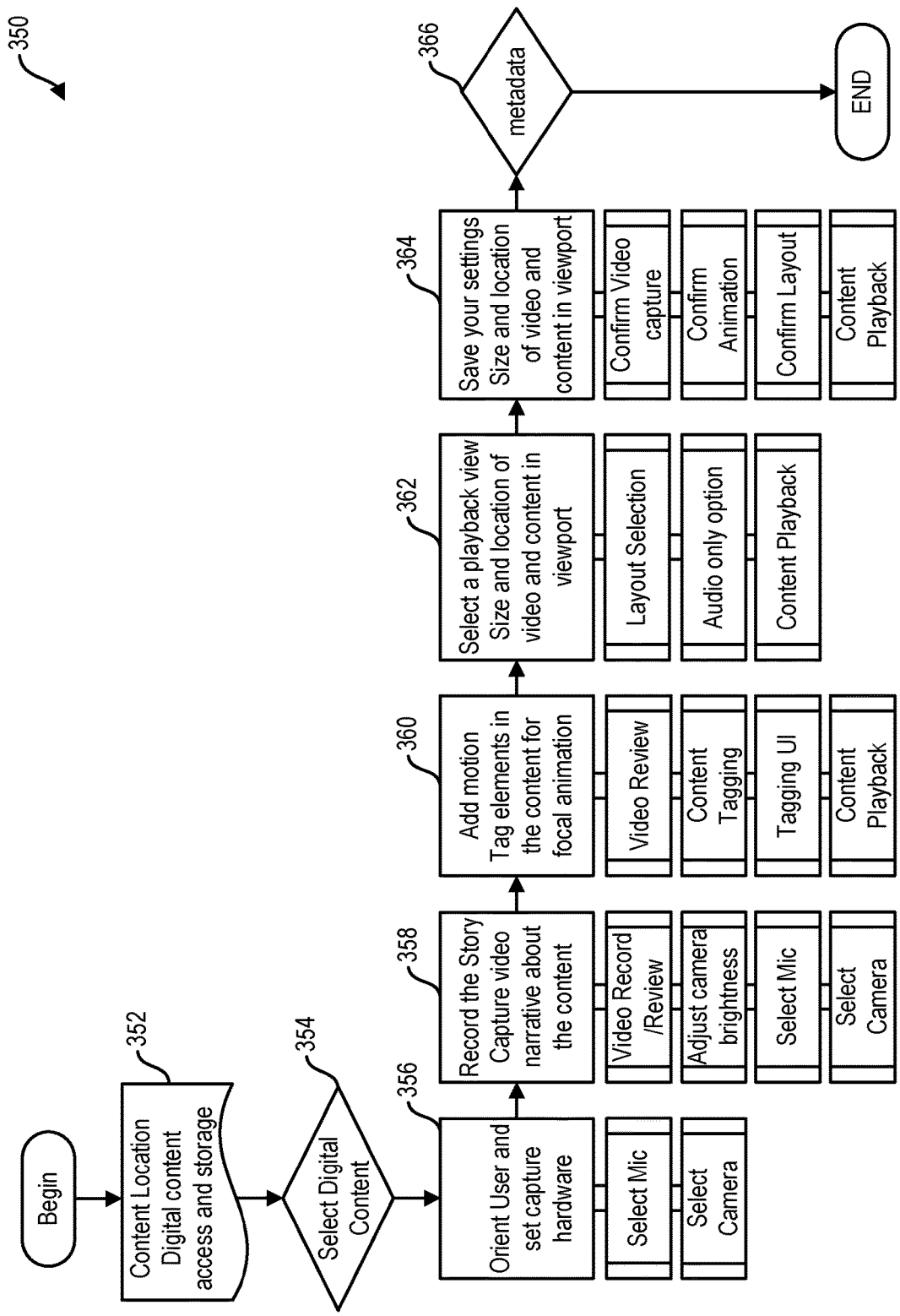
FIG. 3B is a flow diagram illustrating an example process that can be performed by the user interface (UI) control circuit of the disclosed system in some implementations of the present technology.

FIG. 3B is a flow diagram illustrating an example process 350 that can be performed by the user interface (UI) control circuit 244 or another circuit of the disclosed system in some implementations of the present technology.

Figure 4A:
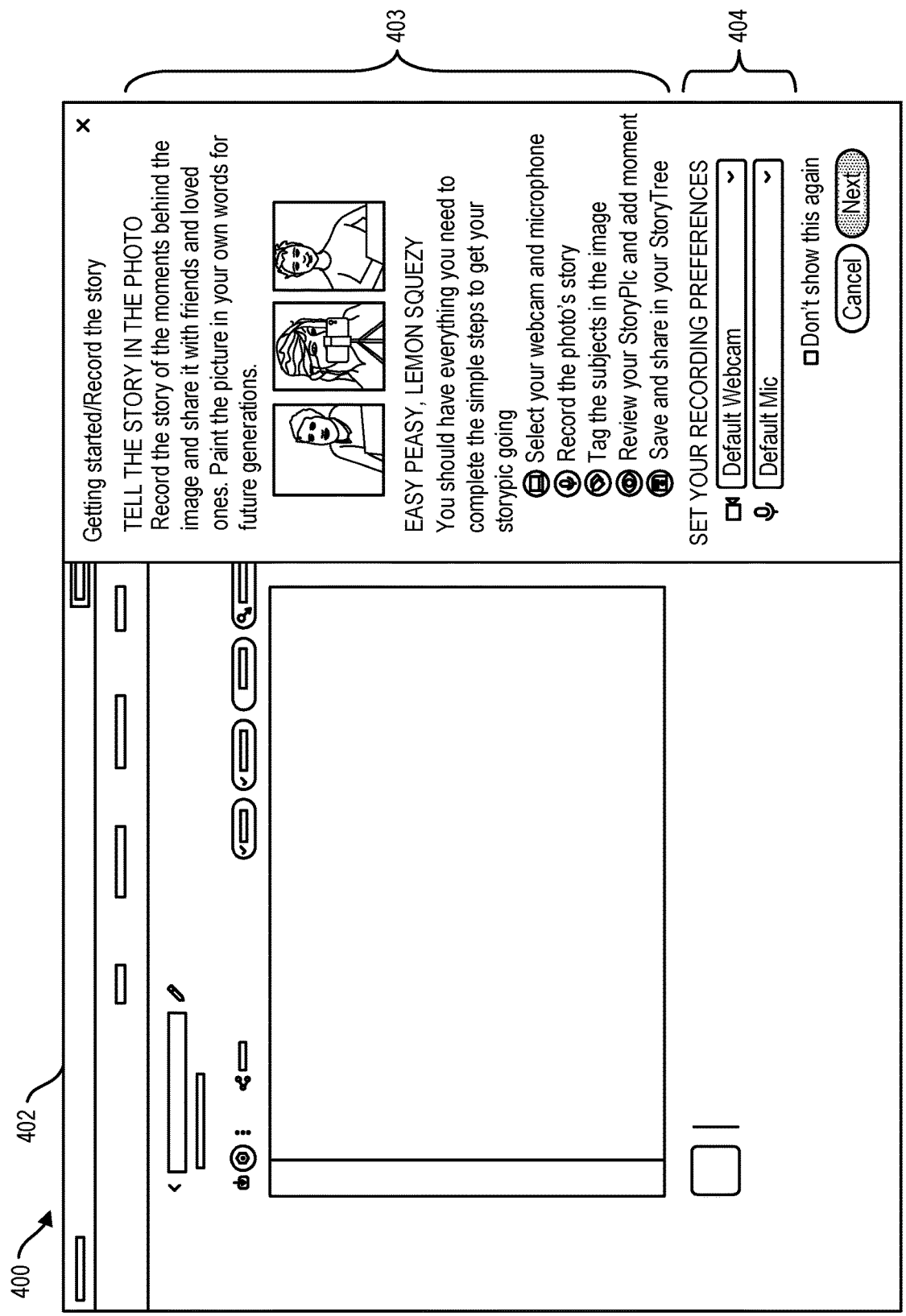
FIGS. 4A-4E illustrate example user interfaces implemented by the disclosed system in some implementations of the present technology.

Process 300 begins by accessing and selecting, at 354, digital content 352 that is to be annotated. FIG. 4A illustrates an example user interface 400 presented to a user at the beginning of process 300. The user interface 400 is structured to perform operations to orient the user 356, which can include providing an instruction set 403 and enabling a user to select hardware 404. The selected hardware can be used as an input device for user images, user annotations, and/or user queries and can include various information capturing devices, such as a microphone, a webcam, a keyboard, a mouse, a touchscreen, and/or other hardware components. The user interface 400 also includes an image viewer 410, which can include a control or a collection of user-interactive controls that allow a user to access and interact with an image. In some implementations, the image viewer 410 also includes a video player.

Process 300 proceeds to recording the story 358 to capture the narrative about the selected content shown in the image viewer 410. The operations at 358 enable the user to select the record/review tools (e.g., camera, microphone, etc.), adjust environmental factors (e.g., brightness), zoom level (s), and so on.

Figure 4B:
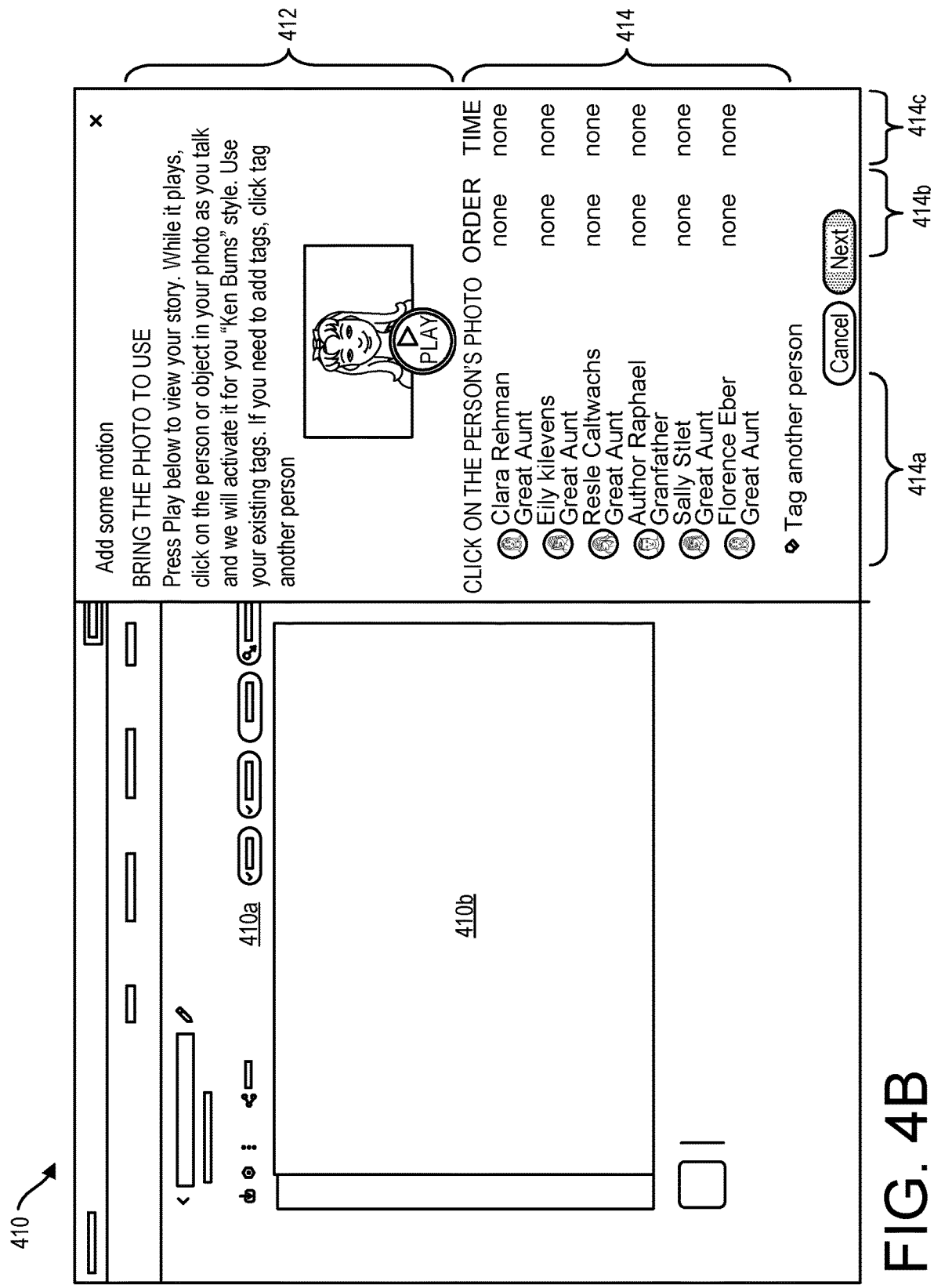

Process 300 enables the user to add annotations/tags 360 in the selected content for local animation. FIG. 4B illustrates a user interface 410 presented to a user when adding annotations/tags. As discussed above, the user can click, tap or otherwise select certain portions of the image (using, for example, various controls 410a) and add audio, visual, emoticons, etc. (displayed in content portion 410b) as annotations/tags to portions of the image according to an instruction set 412. For example, controls 414 (name 414a, order 414b, time 414c) can enable the user to tag individuals during playback of a sequence of images, where the system can automatically determine the associated order of appearance, timestamp, and other parameters associated with the tags and save these items as rich metadata.

Figure 4C:
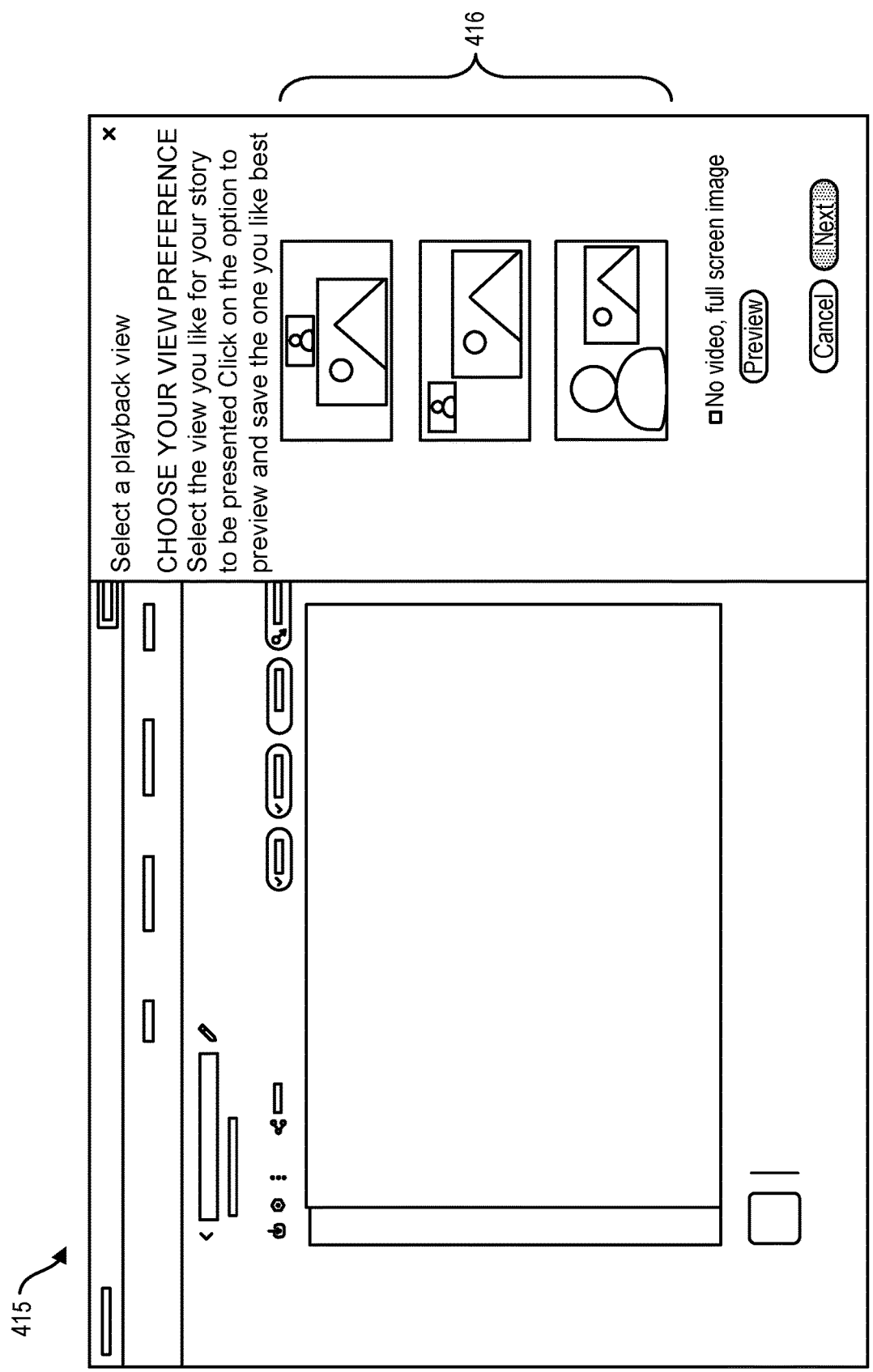
Figure 4D:
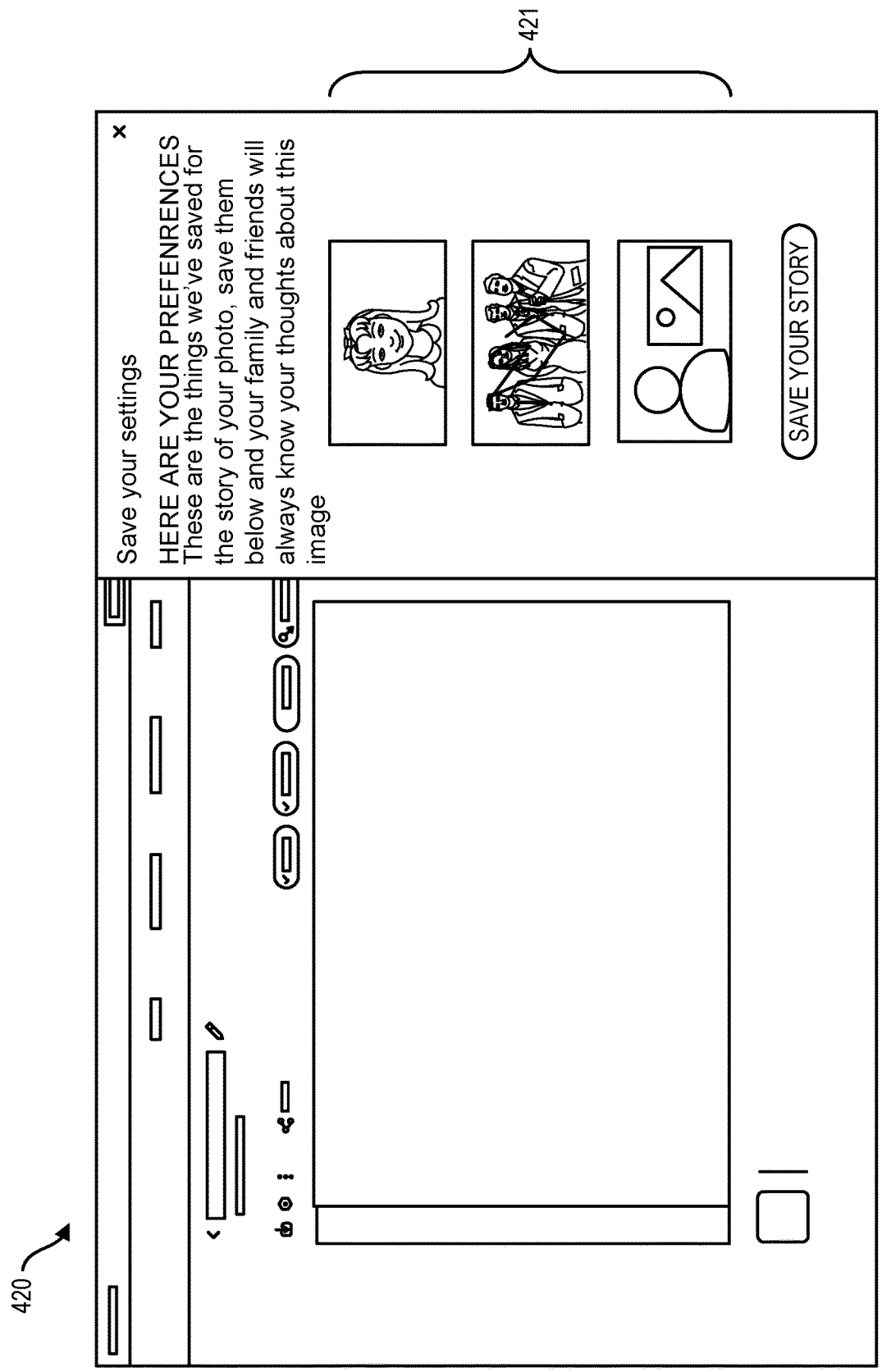
Figure 4E:
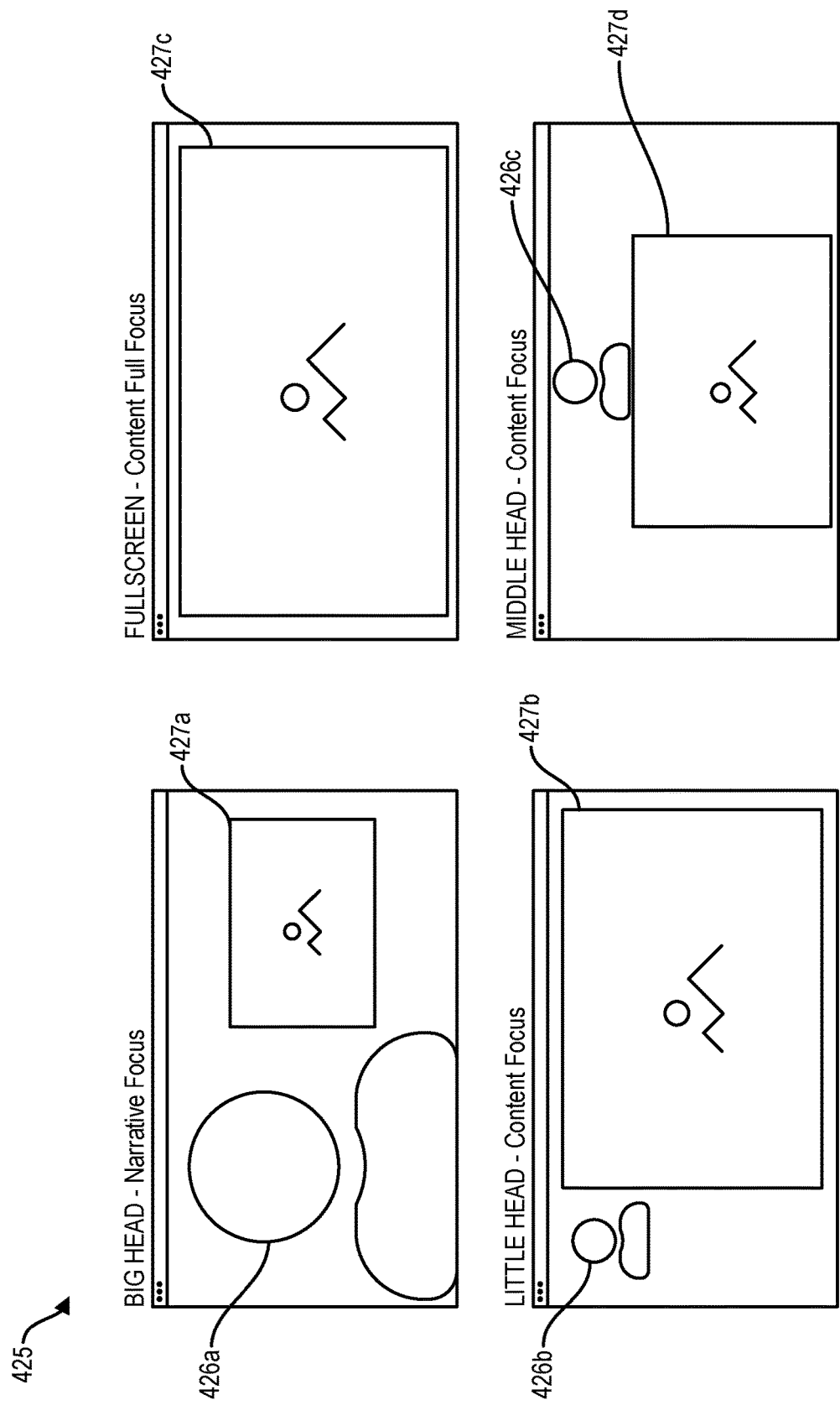

Process 300 enables the user to select a playback view 362, such as by selecting one or more presentation templates 416 shown in FIG. 4C and further illustrated in FIG. 4E. FIG. 4C illustrates a user interface 415 that enables a user to select a view preference. FIG. 4E shows varying example generated user interfaces. The user interfaces can include, at various levels of visual emphasis, a narrator control (426a, 426b, 426c) and/or a content control (427a, 427b, 427c, 427d). According to various implementations, the narrator control (426a, 426b, 426c) can include any of a video of a user narrating, a computer-generated avatar of the user narrating, and/or a photograph of a user. These elements can be captured using a camera associated with a user device, retrieved from the user device or a social media, archival, or other image retrieval network or system (based on, for example, logged-in user information), and/or generated for the user in static or animated avatar form.

Process 300 further enables the user to save the settings 364 by, for example, confirming the content, animation, layout and/or playback selections. FIG. 4D illustrates a user interface 420 presented to the user when saving settings/selections/preferences 421. The process further enables the user to share the original content, annotated content, or both via, for example, social media, email, publishing to a website, text, MMS, and so on. To that end, the process can generate a hyperlink to the generated retrievably stored digital item.

Annotation Capture

Figure 5:
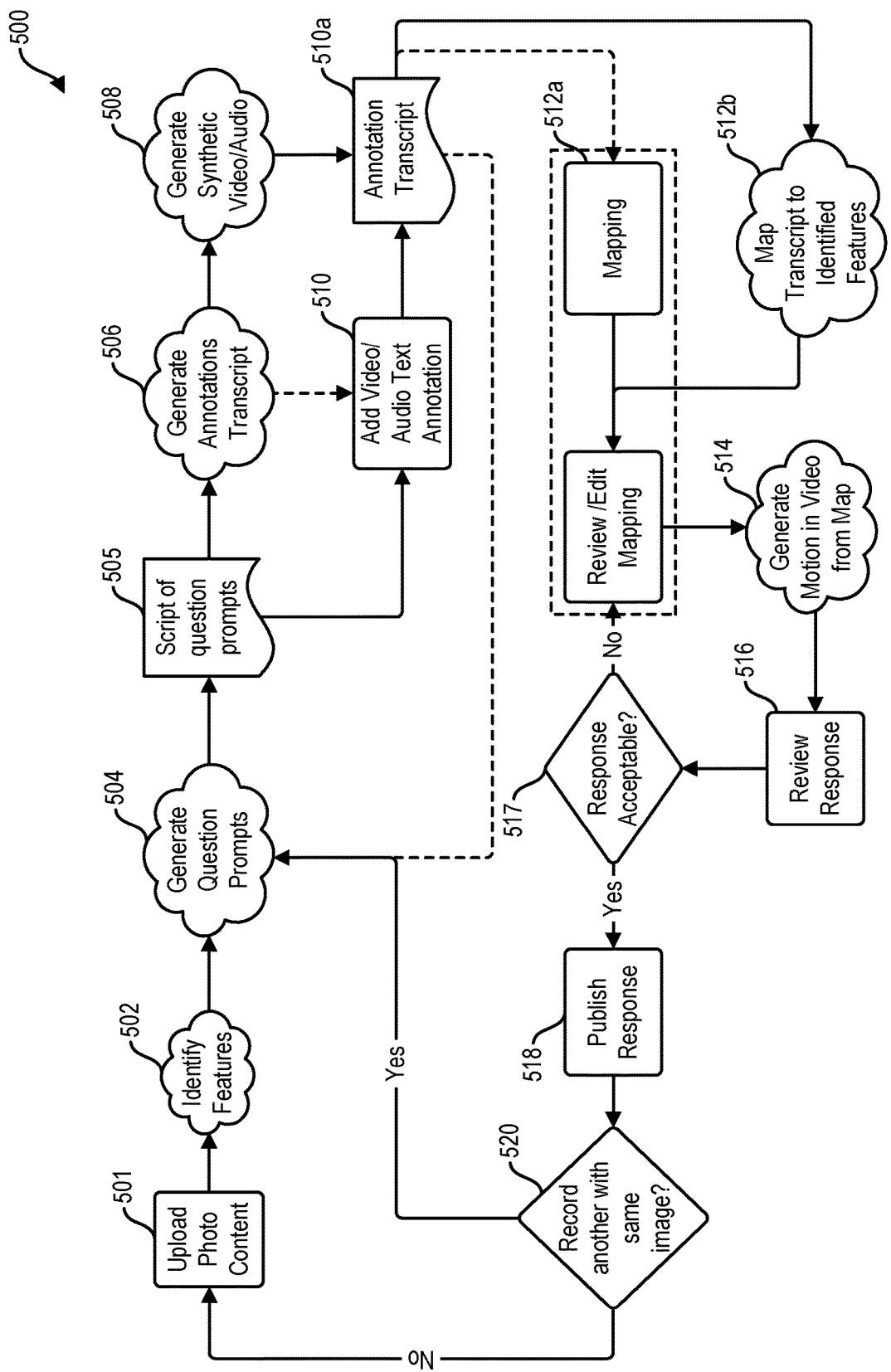
FIGS. 5 and 6 illustrate example flows of operations for recording annotations and marking features for existing images in some implementations of the present technology.
Figure 6:
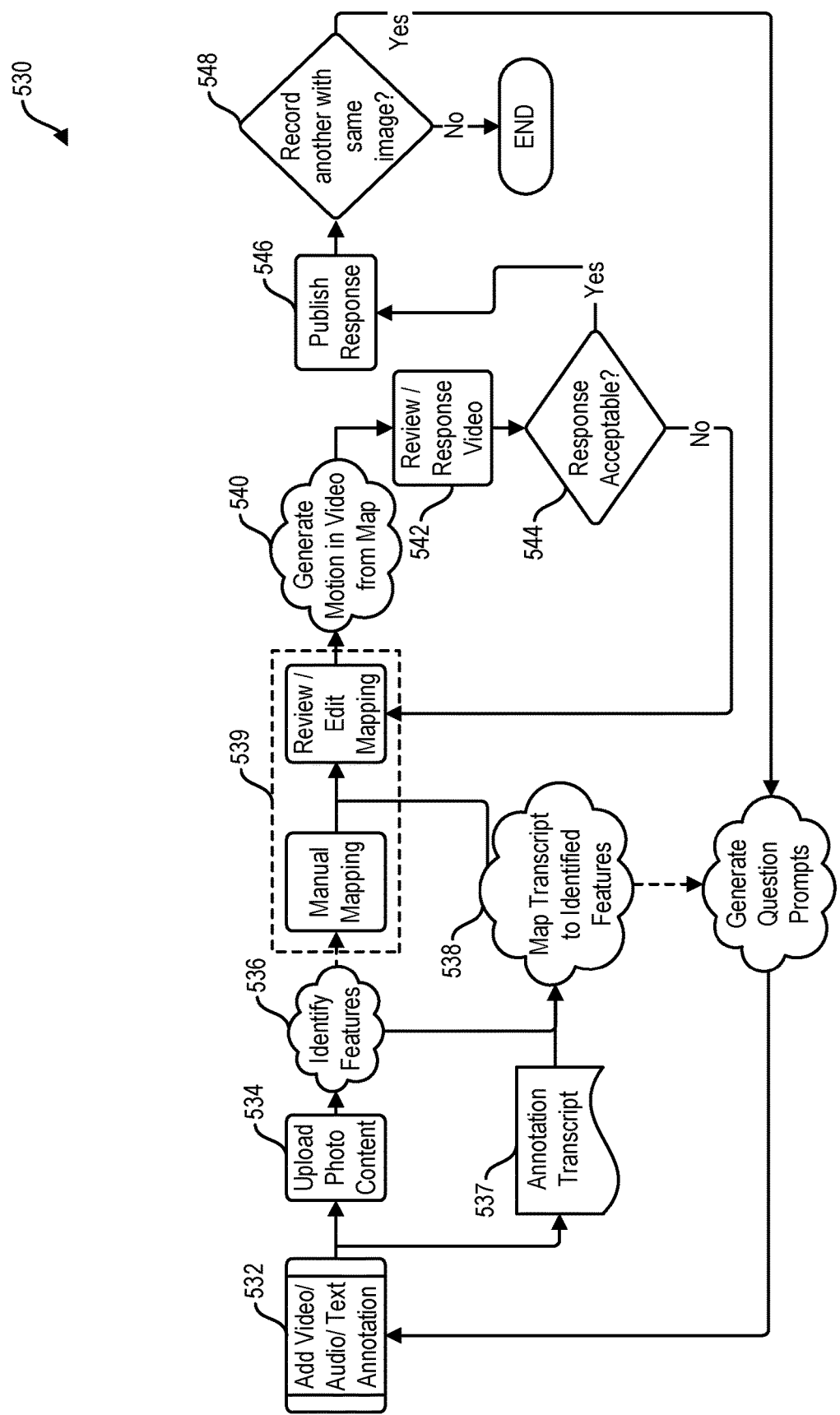

FIGS. 5 and 6 illustrate example flows of operations (500, 530) for recording annotations and marking features for existing images in some implementations of the present technology. According to various implementations, operations (500, 530) can be performed by or on the rich metadata generation circuit 242, UI control circuit 244, source device 234, client device 236 or another suitable computing system or device.

As a general overview of example operations, after a particular image has been added to the system, a user can add one or more annotations, including an audio or video description, then tag relevant features within the image. The system can use the features and description to suggest question prompts and responses. Features can be added manually and/or via machine learning using automatic feature detection. Suitable machine learning models can be used to identify features within images (502, 536), generate question prompts (504), generate annotations (506), generate synthetic video and/or audio (508), map items in transcripts to identified features (512b, 538), and/or generate motion in video from a particular mapping (514, 540). Users can review and edit mappings (512a, 539) and responses to the questions (516, 542).

Further with respect to annotation features, the system provides a number of tools in a single interface that provide the user access to a number of ways to annotate still images at the point of capture or post-capture. In various implementations, example tools can include units of computer-executable code for editing of time metadata, geo-locator metadata, adding text, recording audio, recording video, transcribing audio and video, adding subtitles, adding closed-captions and/or providing automatic translations. In some implementations, the system includes search tools, such as a text input and microphone input for speech-to-text enabled unstructured semantic search, as well as search fields for name, date, time, place and free text search.

The annotation of images can happen at any suitable time during the image processing pipeline. In one case (e.g., the process of FIG. 6), the user can describe the photo prior to providing the photo. For example, the user can record a video or audio clip describing a vacation to New York in May, then upload one or more images and media files from that trip. A second scenario is that the user describes the photo as it is being recorded, for example "This is my cat Sam watching his favorite TV show". In a further use case, a user can annotate one or more photos after it is captured (e.g., the process of FIG. 5) as a user goes back and revisit their image library.

Further with respect to mapping features, in some implementations, while a particular audio annotation is recorded, the user is provided within the user interface that includes one or more controls to click-to-associate faces, objects, and/or features within a particular image in order to link more closely the audio/video descriptions presented at particular points within the audio or video to features within the image. As the user describes (provides a narrative for) a particular image, a time code (e.g., time stamp, relative location within the unit) of each click on the specific area of the image is associated with the annotation.

For example, in an implementation, while the user describes a particular using an audio or video input, s/he states:

"Here is uncle Harry [clicks on image of Uncle Harry among the gathered people in the image) as you can see Monty his beloved flying cat is making a beeline for the chicken shed [clicks on image of cat]."

The visual clicks can be correlated to recognized entities in speech and/or text with manually or automatically labeled entities (e.g., "Harry", "Cat") in photographs and text. The speech can be converted to text using a speech-to-text algorithm, and clicks can be associated with a particular word or another narrative unit (e.g., clause, phrase) and/or time code in the transcription.

In some implementations, the annotation can be typed in as text, with the option of tagging certain words in the text with visual elements. As an example, a user can type:

"Uncle Harry with his beloved cat Monty #Monty #flyingcat".

In some implementations, a user can click on a particular portion of an image (e.g., the face of the mother) while mentioning an attribute (e.g., mentioning the mother's name in association to her daughter's wedding) in the audio transcription. In some implementations, the manual selection of face and features can be accelerated by using machine learning to detect potential matches in the face. For example, in some implementations, the system can apply a facial recognition model, object recognition model, or the like to recognize a face in the image and connect to other photos at the same wedding, or associated to other people, places, objects, and/or events mentioned in the transcription. A user-interface control can be generated to allow a user to accept or reject automatically generated suggestions for facial matches.

Further with respect to object recognition and facial recognition, the related techniques can include face recognition (locating known faces in an image) and/or face identification. When performing face recognition, the system can use any suitable algorithm or combination thereof, such as Haar Cascades, Eigenface, Fischer Faces, 3d analysis, and/or neural network-based classifiers, such as CNN. In some implementations, the training data including facial statistics to assist in identifying known people (friends and family) can be taken from social network photo databases. In some implementations, feature classifiers can be trained on objects that may appear in user stories: animals, food, furniture, vehicles, landmarks, and so forth. In some implementations, facial recognition can draw from online databases of labeled faces such as social media sites to improve detection of friends and family, as well as identify common landmarks such as the Statue of Liberty that appear commonly in publicly available image collections.

In some implementations, the system can utilize text analysis algorithms to identify the corresponding names and/or pronouns in the audio and/or text to refine automatically generated temporal/word tags. According to various implementations, analysis algorithms can include CNNs designed to identify parts of speech and entities such as names, places, times and/or numbers. Examples of sentence preprocessing libraries include NLTK and spaCY. The annotation metadata can be used to increase the accuracy of automatically determined image features. For example, if a person's name is mentioned in the text, a particular algorithm can parametrize or bias the facial search to look for the particular face.

Using a combination of both images and audio/text descriptions creates a technical advantage because it enables a multi-modal approach to identify relevant features in both the images and text. As an example, the system can preprocess images and words to identify feature embeddings. These combined feature vectors can be fed into a neural network or another suitable machine learning model to identify potential relationships with higher confidence than a set of labels alone.

To that end, in some implementations, transformer neural networks can be used. Transformer neural networks are based on learned attention models that identify the relative importance of pairs of features. The network can take as input the embedded word features and their position in the sentence, and the embedded image features and their spatial positions. The transformer model can add the word vector, image vector embeddings, and positional encodings together and pass the result through a series of encoders, followed by a series of decoders. The output probabilities can be converted back into labeled image and text features using, for example, the softmax function. Accordingly, the output of the model can provide the most probable determined matching correspondence between features. For example, given a sentence that describes, "Uncle Harry was bitten by my ginger cat", the model is more likely to identify that the image of face that is close to a detected animal is Uncle Harry, and that the animal is more likely to be a cat than a dog, since a dog is not mentioned in the sentence. According to various implementations, the model can be pretrained on existing labeled databases of image features with text labels. As users add additional labeled images, this data can be further used to train and refine the neural network model.

Generating Question Prompts

Figure 7:
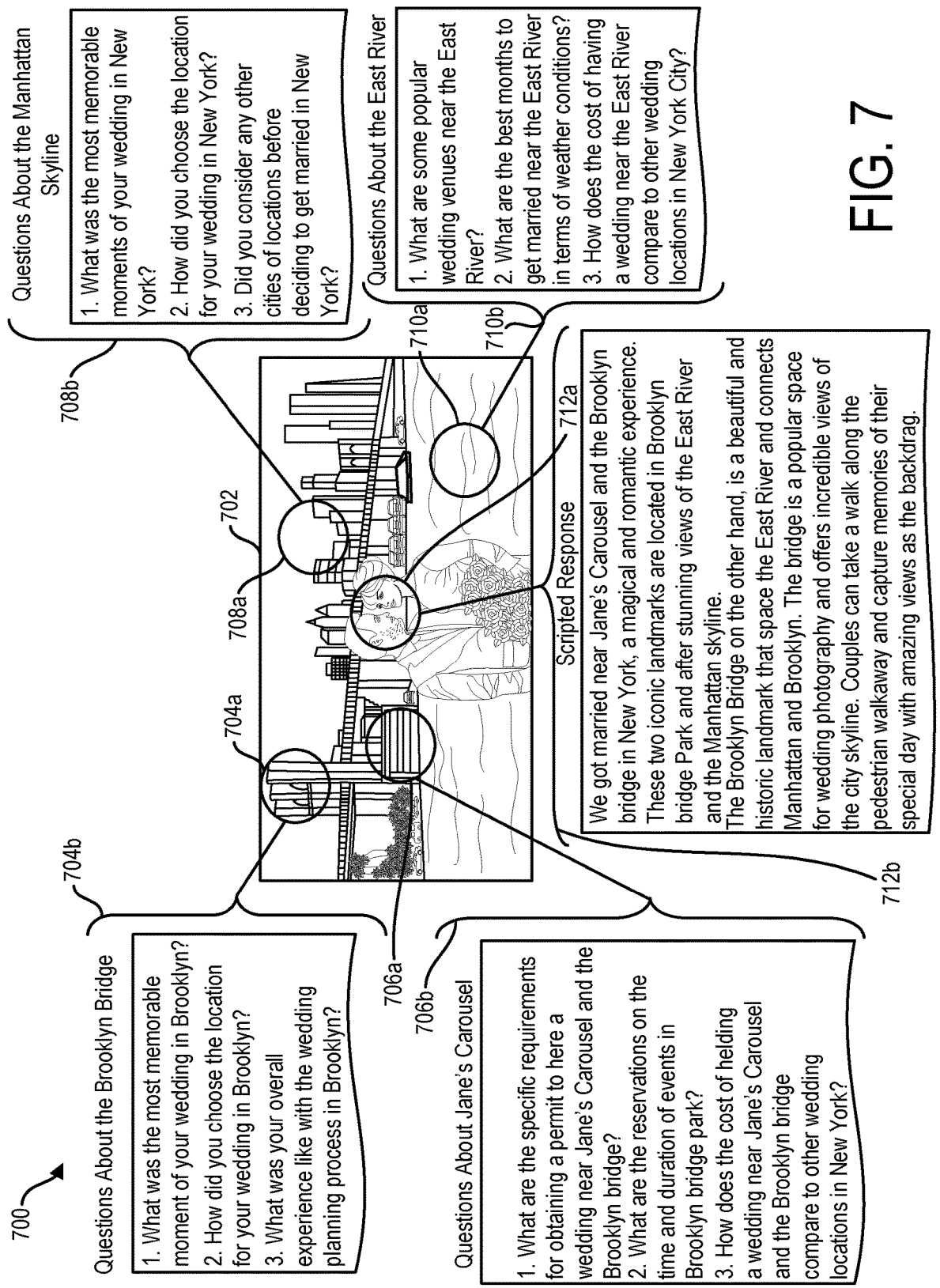
FIG. 7 illustrates an example process whereby annotated features in the image can be used to suggest question prompts in some implementations of the present technology.

FIG. 7 illustrates an example process 700 whereby one or more annotated features (704a, 706a, 708a, 710a) in an image 702 can be used to suggest question prompts (704b, 706b, 708b, 710b) in some implementations of the present technology. As a general overview, the prompts can be automatically generated by a machine learning model, which can apply computer vision, object recognition, enriched metadata analysis, tag analysis, and/or other suitable techniques to generate suitable questions based on the determined object and/or its properties indicated by the rich metadata. In some implementations, for instance, where a narrative is applied (cross-linked) to multiple images and/or when an object (Monty the cat') is recognized to be present in other images with their own sets of enriched metadata and/or in training data ('Brooklyn Bridge'), the generated questions can be further based on properties of a related (linked) determined object or rich metadata item. In some implementations, instead of or in addition to generating the questions, the system can provide a suggested text annotation 712b describing the determined features, people and/or events 712a in the image. The suggested text annotation 712b can be generated using machine learning based on properties of a related (linked) determined object or rich metadata item. In some implementations, the suggested text annotation 712b is dynamically supplemented with tokens (sentence segments) parsed from user responses as the user answers the question prompts. In some implementations, the suggested text annotation 712b is dynamically supplemented using indications of user sentiment determined based on from user responses as the user answers the question prompts. The indications of user sentiment can be based on the terms used, tone of voice, pitch, facial expression analytics, and/or the like. For example, the shown suggested text annotation 712b can include a phrase "We got married near Jane's Carousel and the Brooklyn Bridge in New York" generated using image recognition. The phrase can be supplemented with a clause "a magical and romantic experience" based on the determined indications of user sentiment.

In some implementations, the machine learning model is structured to simulate conversational approaches and generate progressively more granular question prompts to improve the accuracy of the generated suggested text annotation 712b and gather additional clarifying information in a user-interactive manner. For example, a media annotation can be based on a question "What is the story behind this image?"

In some implementations, additional question prompts can be procedurally generated based on the determined items in the image. The additional prompts can follow the form of "who", "what", "where", "why", "when", and "how" as well as general prompts "Tell me about [a determined feature]". For example, if the system sees an unknown face on the left side of the image, a generated question can be "Who is the person on the left?", "Where was this photo taken in New York?". By combining other features detected in the image to determine context for the unknown feature, the system can follow multi-part question templates, such as "who is the man in the green shirt", "tell me about the cat".

In some implementations, additional question prompts can be formulated by a larger generative machine learning model, which can take word vectors from previous prompts and annotations and labeled feature vectors to generate new questions in a natural language form. In some implementations, the model can draw upon training from larger language sources to extrapolate more complex questions and logic. For example, given a photograph of a wedding in New York, the system can extrapolate questions based on the typical weather in New York, or how to obtain a permit for an outdoor wedding in New York.

Generating Animated Paths Between Items

FIG. 8 illustrates an example process 800 whereby annotated features (806, 808) from a source image (802, 804) can be used to generate animated paths 810 between items in some implementations of the present technology.

After a text annotation has been generated, acquired via the user interface, and/or refined, the system can use a generative AI model to generate a synthetic narration. For example, the system can use text-to-speech synthesis to generate audio narration to accompany the original image. In some implementations, the system can use video synthesis to generate an animated avatar or video to accompany the text and audio.

In some implementations, the system can, given a combined annotated image and text, to generate additional visual and/or editing effects. For example, the system can provide multiple templates for presenting the information, such as voice-over narration, picture-in-picture, panning, and other visual emphasis effects. The cuts and pans can draw focus towards the elements that were highlighted in the video, such as by zooming in on a face in the image, or cutting to a relevant photo in the sequence, and so on.

In some implementations, the system can create a visual storyboard, whereby a series of images are laid into a visual sequence or path. The narrator can associate an audio and/or video description of the entire sequence, creating a single story from a set of related images. For example, the following sequence of operations can be performed in relation to images:

Image 1: This is Uncle Harry [click for face] in 1982 [time stamp], our cat loving uncle from Maine [geo-locator]. He never went anywhere without his cat Monty [Tag name].

Image 2: This is Monty the flying cat. [#flyingcat] on the day in 1984 [time stamp] that he actually took to the air and caught a sparrow mid flight in Harry's garden at 100 Main Street, Portland, Maine [geo-locator].

Image 3: Here are Harry [name/face click] and Monty [name/click] at Grandma's [name/face click] eightieth birthday party [event]. Monty [photo location click] is after the chickens [photo location click].

Image 4: This is the seagull that Monty never caught! Grandma [name] [face click] was fuming that this gull stole the picnic, wishing Monty [name] was there at Myrtle beach [geo-locator].

The above example operations and digital tools enable analysis of the structure of the story, identifying the key people, places, events and/or actions in the image or sequence of images assembled and narrated.

In some implementations, a set of images can be played as a sequence, searched individually across the assembled subset, and/or searched across the entire database where they are filed. In some implementations, the system provides the ability to tag elements and animate the content to highlight those elements in alignment with the recorded narrative. In some implementations, the system further enables generation of "focal animation" versions of digital content synced with narrative video capture.

In some implementations, multiple animation paths and annotated descriptions can be recorded for the same image. For example, in the search phase, different user questions can tell a story behind the photo and zoom in on different objects and people.

In some implementations, once a visual path of sequence has been defined, the system can render the animation as a new static video and/or dynamically at runtime. If rendered dynamically at runtime as the animation is generated, additional generated metadata encodes the relative positions and sizes of the elements and renders them in the video player (e.g., a video player control rendered via a display component of a computing device). In some implementations, characteristics of a particular user device and/or video player (e.g., device type, operating system version, browser version, video player version, screen size, application window state (e.g., maximized, minimized)) are considered during the dynamic rendering. This provides a technical advantage of allowing multiple paths and compositions to be generated using the same source materials according to specifications of different web browsers and video players.

In some implementations, depth information may be available for the image or input multimedia. For example, this information can be provided by the user, generated from stereo input, depth sensors, and/or inferred by 2D to 3D conversion algorithms. The depth information can be per pixel and/or include a segmentation of the scene into layers. Depth information can allow for motion parallax effects to be generated during the animation, with more distant objects moving more slowly during the movement.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative embodiments may employ differing values or ranges.

The teachings of the technology provided herein can be applied to other systems, not necessarily the system described above. The elements and acts of the various examples described above can be combined to provide further embodiments of the technology. Some alternative embodiments of the technology may include not only additional elements to those embodiments noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. At least one computer-readable medium having computer-executable instructions stored thereon, the computer-executable instructions structured, when executed by at least one processor of a computing system, to cause the computing system to perform operations comprising:
 identifying an image feature in an image included in a set of images;
 generating a feature annotation, comprising:
  capturing a narrative, via one or more information capturing devices, the narrative comprising at least one of a video file, an audio file, or text;
  based on the captured narrative, generating a transcript;
  using the transcript to determine set a set of narrative units; and
  mapping a particular narrative unit from the set of narrative units to the identified image feature to generate the feature annotation; and
 using the generated feature annotation and based on the image, generating an enriched image,
 wherein the enriched image comprises rich metadata, the rich metadata comprising the feature annotation.

2. The at least one computer-readable medium of claim 1, causing the computing system to perform operating further comprising:
 generating a feature animation by generating an image sequence comprising the enriched image,
 wherein the identified image feature is visually emphasized based on the feature annotation.

3. The at least one computer-readable medium of claim 2, causing the computing system to perform operating further comprising rendering the feature animation via a user interface while capturing the narrative.

4. The at least one computer-readable medium of claim 1, wherein capturing the narrative is performed prior to or after identifying the image feature.

5. The at least one computer-readable medium of claim 1, causing the computing system to perform operating further comprising:
 based on an item associated with the narrative, the item comprising at least one of a particular term, tone of voice, pitch, or facial expression category, generating a sentiment indication; and
 including the sentiment indication in the feature annotation.

6. The at least one computer-readable medium of claim 1, causing the computing system to perform operating further comprising cross-linking the narrative to a plurality of images comprising the image.

7. The at least one computer-readable medium of claim 1, causing the computing system to perform operating further comprising cross-linking the narrative to a second identified image feature within the image.

8. The at least one computer-readable medium of claim 1, wherein the rich metadata further comprises at least one of a label associated with the identified image feature, a tag associated with the identified image feature, a time code, or geospatial metadata.

9. The at least one computer-readable medium of claim 1, causing the computing system to perform operating further comprising using the generated feature annotation, generating, by a third machine learning model, a query.

10. The at least one computer-readable medium of claim 9, causing the computing system to perform operating further comprising:
 generating a user interface and presenting, via the user interface, on a user device, the query;
 capturing a user response to the query;
 generating a series of queries based on at least one of an item within the query or the captured user response; and
 presenting, via the user interface, on the user device, the series of queries.

11. The at least one computer-readable medium of claim 10, causing the computing system to perform operating further comprising:
 based on the captured user response, searching a plurality of rich metadata items associated with a set of images,
 wherein the set of images is automatically determined by determining one of a family tree or family group associated with at least one of a user and the identified image feature.

12. The at least one computer-readable medium of claim 11, causing the computing system to perform operating further comprising based on the captured user response, updating the rich metadata.

13. The at least one computer-readable medium of claim 1, causing the computing system to perform operating further comprising generating a synthetic annotation for the enriched image by combining a plurality of rich metadata features for a plurality of identified features.

14. The at least one computer-readable medium of claim 13, causing the computing system to perform operating further comprising supplementing the synthetic annotation with additional user input.

15. The at least one computer-readable medium of claim 13, causing the computing system to perform operating further comprising:
 generating the synthetic annotation based on an additional plurality of rich metadata features generated for a different enriched image; and
 associated the synthetic annotation with the enriched image and the different enriched image.

16. The at least one computer-readable medium of claim 15, causing the computing system to perform operating further comprising determining the different enriched image by providing the identified image feature to a fourth machine learning model trained to identify related images based on an item in the identified image feature.

* * * * *